United States Patent
Kajio

(10) Patent No.: US 8,431,261 B2
(45) Date of Patent: Apr. 30, 2013

(54) FUEL CELL COMPONENT INCLUDING AN IDENTIFICATION DISPLAY PORTION

(75) Inventor: Katsuhiro Kajio, Anjo (JP)

(73) Assignees: Aisin Seiki Kabushiki Kaisha, Kariya-shi (JP); Toyoyta Jidosha Kabushiki Kaisha, Toyota-shi (JP)

( * ) Notice: Subject to any disclaimer, the term of this patent is extended or adjusted under 35 U.S.C. 154(b) by 1229 days.

(21) Appl. No.: 11/848,909

(22) Filed: Aug. 31, 2007

(65) Prior Publication Data

US 2008/0063918 A1    Mar. 13, 2008

(30) Foreign Application Priority Data

Sep. 7, 2006  (JP) .................................. 2006-242921

(51) Int. Cl.
*H01M 14/00* (2006.01)
(52) U.S. Cl.
USPC ............... 429/8; 429/452; 429/507; 369/284; 369/277; 235/435; 235/454; 235/462.01
(58) Field of Classification Search .............. 429/8, 452, 429/507; 369/284, 277; 235/435, 454, 462.01
See application file for complete search history.

(56) References Cited

U.S. PATENT DOCUMENTS

| | | | |
|---|---|---|---|
| 4,625,101 A * | 11/1986 | Hinks et al. | 235/462.01 |
| 4,963,464 A * | 10/1990 | Setani | 430/495.1 |
| 5,948,557 A | 9/1999 | Ondeck et al. | |
| 6,740,611 B2 | 5/2004 | Hatano | |
| 2004/0247951 A1 * | 12/2004 | Inagaki et al. | 429/12 |

FOREIGN PATENT DOCUMENTS

| | | |
|---|---|---|
| EP | 1 197 346 A2 | 4/2002 |
| JP | 62-115649 | 5/1987 |
| JP | 5-256014 | 10/1993 |
| JP | 5-305686 | 11/1993 |
| JP | 6-13475 | 1/1994 |
| JP | 2001-253763 | 9/2001 |
| JP | 2001-253767 | 9/2001 |
| JP | 2002-161997 | 6/2002 |
| JP | 2003-115319 | 4/2003 |
| JP | 2003-119078 | 4/2003 |
| JP | 2004-179124 | 6/2004 |
| JP | 2004179124 A * | 6/2004 |
| JP | 2005-123003 | 5/2005 |
| JP | 2006-277965 | 10/2006 |
| WO | WO 03/012902 A2 | 2/2003 |
| WO | WO-2006/112402 A1 | 10/2006 |

OTHER PUBLICATIONS

Japanese Office Action issued Jun. 26, 2012, in Japan Patent Application No. 2006-242921 (with English translation).

* cited by examiner

*Primary Examiner* — Zachary Best
(74) *Attorney, Agent, or Firm* — Oblon, Spivak, McClelland, Maier & Neustadt, L.L.P.

(57) ABSTRACT

A fuel cell component includes a fuel cell component body having a surface, and an identification information display portion provided on the fuel cell component body. The identification information display portion is provided at a recessed region of the fuel cell component body recessed relative to the surface.

8 Claims, 7 Drawing Sheets

FIG. 3
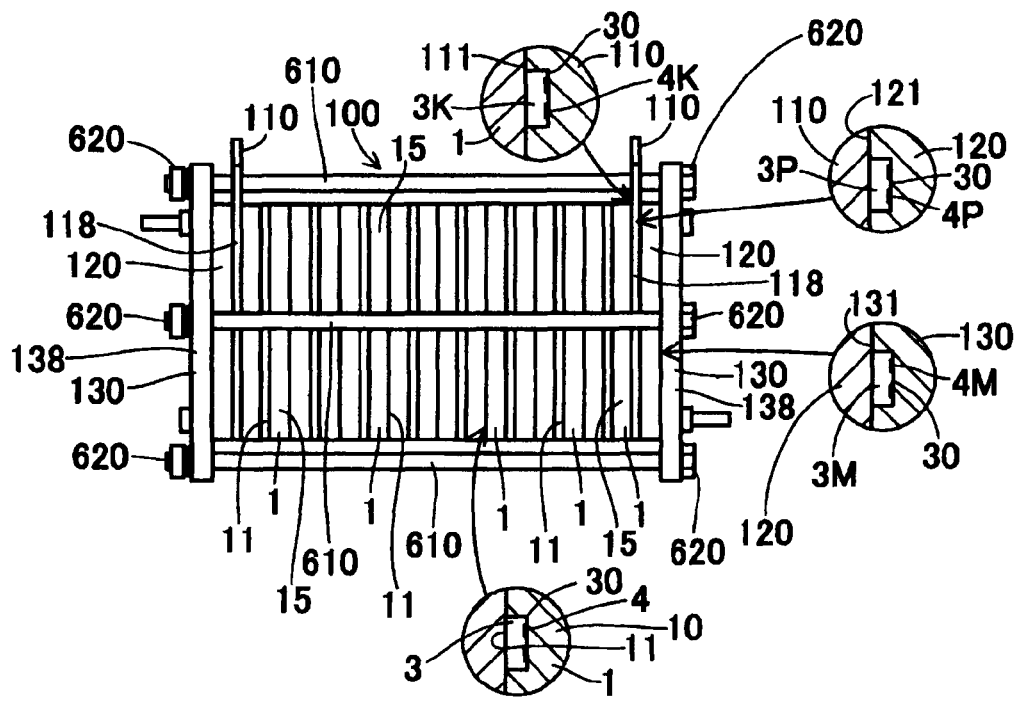
FIG. 4A  FIG. 4B  FIG. 4C
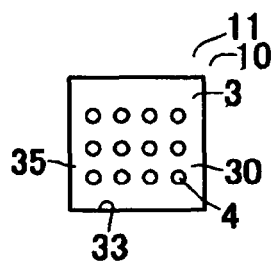 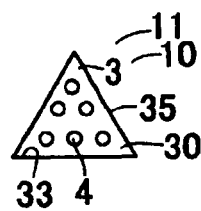 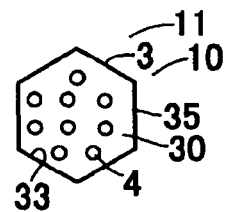
FIG. 4D  FIG. 4E  FIG. 4F
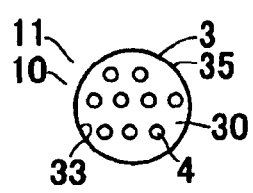 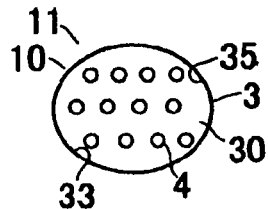 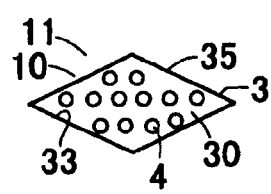

US 8,431,261 B2

FUEL CELL COMPONENT INCLUDING AN IDENTIFICATION DISPLAY PORTION

CROSS REFERENCE TO RELATED APPLICATIONS

This application is based on and claims priority under 35 U.S.C. §119 with respect to Japanese Patent Application No. 2006-242921 filed on Sep. 7, 2006, the entire content of which is incorporated herein by reference.

FIELD OF THE INVENTION

The present invention relates to a fuel cell component.

BACKGROUND

Known fuel cell components are disclosed. For example, JP2004-179124A describes a separator for a fuel cell which includes an outer wall surface on which identification codes indicating unique information for the separator are provided. The identification codes provided on the outer wall surface are easily visible. According to the separator for the fuel cell described in JP2004-179124A, the separator can be identified on the basis of the identification codes. JP2003-115319A describes a fuel cell which includes a separator having a side end surface exposed to the outside of the separator, and a barcode indicating the unique information of a cell is attached on the side end surface. JP2003-119078A and JP2001-253763A describe an identifier providing technology in which an identifier is formed by irradiating a laser beam onto a ceramic product before baking, and the ceramics product is baked thereafter.

According to the construction described in JP2004-179124A, when the separator for the fuel cell is in use for a long period of time, there is a risk that the identification code formed on the separator may gradually disappear. According to the construction described in JP2003-115319A, when the fuel cell is in use for the long period of time, there is a risk that the barcode may be ablated. Likewise, according to the constructions descried in JP2003-119078A and JP2001-253763A, the identification code formed on the separator may gradually disappear by abrasion when used for the long period of time.

A need thus exists for a fuel cell component which is not susceptible to the drawback mentioned above.

SUMMARY OF THE INVENTION

In light of the foregoing, the present invention provides a fuel cell component, which includes a fuel cell component body having a surface, and an identification information display portion provided on the fuel cell component body. The identification information display portion is provided at a recessed region of the fuel cell component body recessed relative to the surface.

According to another aspect of the present invention, a fuel cell component, which includes a fuel cell component body having a surface, an identification information display portion provided at a wall surface of the fuel cell component body, and a projection portion projecting from the wall surface on which the identification information display portion is formed in a direction to be away from the identification information display portion and restraining a contact of the identification information display portion with another member.

BRIEF DESCRIPTION OF THE DRAWINGS

The foregoing and additional features and characteristics of the present invention will become more apparent from the following detailed description considered with reference to the accompanying drawings, wherein:

FIG. 3 is a lateral view schematically showing a stack according to a second embodiment of the present invention.

FIG. 4 is a plane view schematically showing a recess and the vicinity thereof for a separator according to a third embodiment of the present invention.

DETAILED DESCRIPTION

Figure 1:
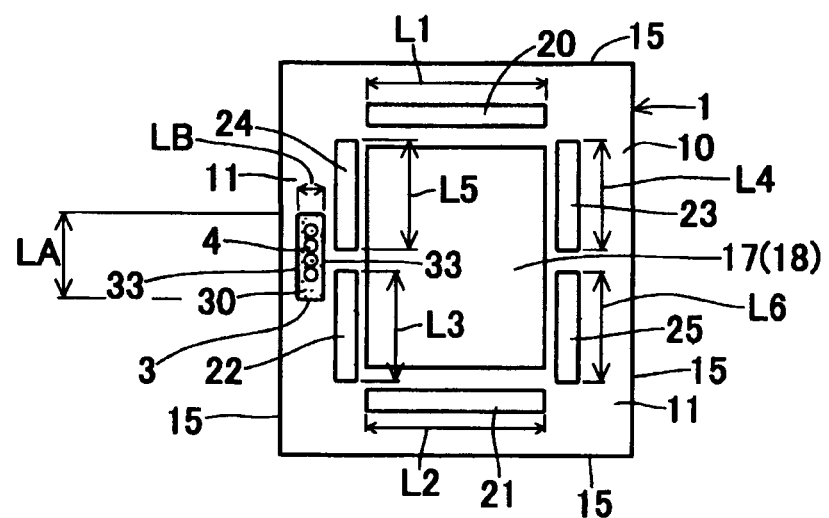
FIG. 1 is a plane view schematically showing a separator according to a first embodiment of the present invention.

Embodiments of the present invention will be explained with reference to illustrations of drawing figures as follows.

A fuel cell component includes a fuel cell component body (i.e., hereinafter referred to as a component body), which includes a surface, and an identification information display portion, which is provided at the component body. The identification information display portion displays the information regarding the component body. Particularly, the identification information display portion displays, for example, production data (e.g., place of production, producer, production date), sales information (e.g., place of sale, distributor, date of sale), and product information (e.g., type, material, specification, trade name, manufacturing process data). The identification information display portion displays the identification information attained, or displayed on the basis of at least one of optical property (optical characteristics), magnetic property (magnetic characteristics), visual characteristics, and recessed and/or protruding configuration characteristics. The optical property has identification capability based on light absorbance and/or light reflectivity. The magnetic property has identification capability based on magnetic pole or magnetic flux density, or the like. The visual characteristics is megascopic identification capability. As the identification information display portion, for example, characters, numbers, signs, patterns, or the like, are applied. Further, as the identification information display portion, for example, a barcode, a QR code, or the like, is applied. In order to form the identification information display portion, at least one of printing, mechanical marking, cutting process, irradiating laser beam (i.e., high energy density beam), inkjet, thermal marking, ink stamp, etching, or the like, is adopted. The printing includes, for example, relief printing (surface printing), offset printing, raised printing in which a type or the like is raised, foam printing, or the like.

The identification information display portion is provided at a region which is formed being recessed relative to the surface of the component body. Thus, even when the surface of the component body is abraded, abrasion of the identification information display portion is restrained. Accordingly, the identification information display portion functions for the long period of time. In those circumstances, the recessed region is an area of a wall surface which forms an inside of the recessed portion. Materials of the fuel cell component body is not particularly limited, and the fuel cell component body may be made of metal system, carbon system, resin system, ceramic system, carbon-resin mixed system, metal-resin mixed system, ceramic-resin mixed system, or the like. The surface of the component body has, for example, self-abrasive characteristics. For example, when the component body is formed by shaping conductive particles, the component body is likely to be worn out. However, because the identification display portion is provided at the recessed region, even when the surface is abraded, the abrasion of the identification information display portion is restrained. The recessed region may be configured to either have or not to have a bottom.

The fuel cell may include a polymer electrolyte fuel cell, a phosphoric acid fuel cell, a solid oxide fuel cell, or the like. The fuel cell component may be a part which is applied to a stack type fuel cell, or a part which is applied to a tube type fuel cell, or the like. For example, at least one of a separator which is applied to a fuel cell stack, an insulation member, a terminal member, and an end plate is applied as the fuel cell component. Further, for example, a membrane electrode assembly is applied as the fuel cell component. The membrane electrode assembly is formed by alternately stacking a fuel electrode (anode) to which fuel is supplied and which is porous and electrically conductive, a proton conducting film which includes proton conductivity, and an oxidant electrode (cathode) to which oxidant is supplied and which is porous and electrically conductive. In those circumstances, the recessed region may be formed at at least one of the fuel electrode, the proton conducting film, and the oxidant electrode, and the identification information display portion may be provided on a wall surface which forms the recessed region.

The recessed region is, for example, formed being recessed from a portion which contacts with another member of the component body when the component body is assembled. The portion which contacts with other members when assembled is likely to be worn out. However, because the identification information display portion is formed at the recessed region, the abrasion of the identification information display portion is restrained. According to the embodiment, the recessed region is provided at a portion of the component body which is visible when assembled. According to this construction, the identification information display portion is readily identified visually.

With a construction in which a region which is recessed relative to a surface of the component body includes an outline, a configuration of the outline per se may have an identification information display function. The configuration of the outline of the recessed region is more visible compared to a barcode, a QR code, Braille, or the like.

According to the embodiment, the recessed region may include plural bottom surfaces which have different levels of depth from one another. In those circumstances, a general identification information display portion (i.e., serving as a first identification information display portion) is provided on a bottom surface at a predetermined level of depth, and an identification information display portion which has a relatively higher priority than the general identification information display portion (i.e., serving as a second identification information display portion) is provided at a bottom surface whose level is deeper than the predetermined depth of the bottom surface on which the general identification information display portion is provided. According to the foregoing construction, while exhibiting the identification information display function, volume of recessed space is reduced. Further, according to the embodiment, a portion which indicates, or points to a direction to read the identification information display portion is provided at the recessed region and/or the identification information display portion. Because the reading direction is indicated, a reading error can be restrained. Further, according to the embodiment, the recessed region may include a partition portion which divides the recessed region into plural recessed regions. The foregoing construction is appropriate when a projected area of the recessed region is relatively large.

A first embodiment of the present invention will be explained referring to FIGS. 1-2 as follows. A separator body 10 of a separator (i.e., serving as a fuel cell component body) 1 shown in FIG. 1 may be made of any materials of carbon system, metal system, resin system, or carbon-resin system. The carbon system material, for example, includes solidified carbon system material such as graphite. The metal system, for example, includes stainless steel, intermetallic compound, or the like. The resin system, for example, includes injection moldings, compression moldings, or the like. It is preferable that the resin system is electrically conductive resin system. The carbon-resin system, for example, includes solidified carbon system using resin as binder. The separator body 10 may be made of material combining the foregoing materials. For example, a portion of a separator on which fluid passage is formed may be made of material of metal system or carbon system and surrounding portions of the fluid passage may be made of resin system material which does not include the electrical conductivity.

The separator body 10 of the separator 1 is shaped in a plate form. The separator 10 includes plural (e.g., two) flat surfaces (i.e., serving as a surface) 11, 11 which are opposite to each other and plural (e.g., four) side end surfaces (i.e., serving as a surface) 15, 15. An oxidant inlet bore 20, an oxidant outlet bore 21, a fuel inlet bore 22, a fuel outlet bore 23, a coolant inlet bore 24, and a coolant outlet bore 25 are formed at the surface 11 penetrating through the separator body 10 in a thickness direction thereof. The configuration of the oxidant inlet bore 20, the oxidant outlet bore 21, the fuel inlet bore 22, the fuel outlet bore 23, the coolant inlet bore 24, and the coolant outlet bore 25 are not limited to the configuration shown in FIG. 1, and may be varied.

A first surface fluid passage 17 is formed on one of the surfaces 11 of the separator 1. A second surface fluid passage 18 is formed on the other surface 11 (i.e., backside) of the separator 1. The first surface fluid passage 17 and the second surface fluid passage 18 are provided at the opposite sides of the separator 1. A guide groove is formed at the first surface fluid passage 17 and the second surface fluid passage 18 so that an active material flows therethrough.

Plural types of the separator 1 are attacked together. Namely, the first surface fluid passage 17 and the second surface fluid passage 18 may serve as the following manner according to the embodiment. First, either one of the first surface fluid passage 17 and the second surface fluid passage 18 serves as a fuel passage and the other of the first surface fluid passage 17 and the second surface fluid passage 18 serves as an oxidant passage. Second, either one of the first surface fluid passage 17 and the second surface fluid passage 18 serves as a fuel passage and the other of the first surface fluid passage 17 and the second surface fluid passage 18 serves as a coolant passage. For example, cooling water is applied as the coolant. Third, either one of the first surface fluid passage 17 and the second surface fluid passage 18 serves as an oxidant passage and the other one of the first surface fluid passage 17 and the second surface fluid passage 18 serves as a coolant passage.

Figure 2:
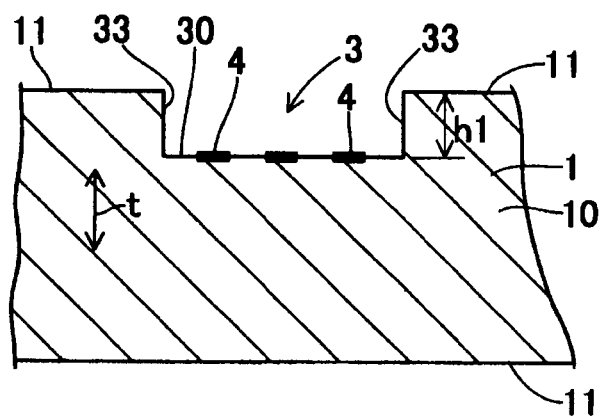
FIG. 2 is a cross-sectional view schematically showing a recess and the vicinity thereof for the separator according to the first embodiment of the present invention.

As shown in FIG. 1, the separator body 10 includes the flat surfaces 11, 11. The surface 11 comes in contact with another separator 1 (i.e., another member) when the separator 1 is assembled. A recess (i.e., serving as a recessed region) 3 having a depth h1 relative to the surface 11 and a bottom is formed on the separator 1. The recess 3 serves as a region which is recessed relative to the surface 11. Although the depth h1 may vary depending on material and/or thickness, or the like, of the separator 1, any size is acceptable as long as being equal to or greater than 0.01 micrometers. For example, the depth h1 may be equal to or greater than 0.1 micrometers, equal to or greater than one micrometer, or equal to or greater than ten micrometers. When defining a relative thickness of the separator 1 as one hundred (i.e., 100), the depth h1 may be equal to or less than eighty (i.e., 80), or equal to or less than sixty (i.e., 60), or equal to or less than thirty (i.e., 30) although the size of the depth h1 varies depending on the size of the recess 3 and/or the material of the separator, or the like. The recess 3 may be formed to be recessed simultaneously with forming the separator body 10 with a molding die. The recess 3 may also be formed to be recessed after forming the separator body 10 by cutting process, laser beam processing, or the like. The recess 3 is formed on the separator 1 outward relative to the first surface passage 17 and the second surface passage 18. The recess 3 includes a bottom surface 30 which is along the surface 11 of the separator 1 and a side surface 33 which is formed continuously from the bottom surface 30 in a thickness direction (i.e., direction t in FIG. 2) of the separator 1. Identification information display portions 4 are provided at a region of the separator body 10 recessed compared to the surface 11, that is, at the bottom surface 30 of the recess 3.

The side surface 33 of the recess 3 serves as a protrusion, which protrudes from the bottom surface 30 (i.e., wall surface) of the recess 3 and on which the identification information display portion 4 is formed, to be away from the identification information display portion 4. The recess 3 is provided at a position where the recess 3 does not interfere with the surface passages 17, 18 in which reactant gas or cooling water flows. Thus, the recess 3 is formed at a region of the separator body 10 other than the surface passages 17, 18 in which the reactant gas or the cooling water flows. Accordingly, the identification information display portion 4, which is formed on the bottom surface 30 of the recess 3, basically, does not come in contact with the reactant gas and the water such as the cooling water which flow in the surface passages 17, 18. Because the identification information display portion 4 does not protrude outward from the surface 11 and is formed at a level lower than the surface 11, the identification information display portion 4 is unlikely to come in contact with other members.

The identification information display portion 4 displays the information regarding the component body. Particularly, the identification information display portion 4, for example, displays production data (e.g., place of production, producer, production date), sales information (e.g., place of sale, distributor, date of sale), and product information (e.g., type, material, specification, trade name, manufacturing process data). In order to form the identification information display portion 4, at least one of printing, mechanical marking, cutting process, irradiating laser beam, inkjet, thermal marking, ink stamp, etching, or the like, is adopted. In case where the separator 1 is formed by pressure forming, mechanical marking of the identification information display portion 4 may be formed simultaneously with the pressure forming of the separator 1.

As explained above, according to the embodiment, the identification information display portion 4 is formed on the bottom surface 30 of the recess 3 (i.e., wall surface of recessed region), and the identification information display portion 4 is positioned within a space of the recess 3. Accordingly, a contact or collision of the identification information display portion 4 and other members is restrained. Consequently, friction or abrasion of the identification information display portion 4 is restrained. In those circumstances, even when the surface 11 of the separator 1 is abraded, abrasions of the identification information display portion 4 which is formed at the recess 3 is restrained because the recess 3 includes the depth h1. Accordingly, the identification information display portion 4 exerts, or exhibits displaying function for a long term. When the identification information display portion 4 is integrally formed with the separator 1, a risk of the identification information display portion 4 peeling-off is reduced unlike the case where an identification tape is applied.

In case where the identification information display portion 4 is formed on the surface 11 of the separator 1, when a stack is formed by accumulating plural separators 1 in a thickness direction, the identification information display portion 4 may be abraded by the adjacent separator 1. According to the embodiment of the present invention, even when a stack is formed by accumulating plural separators 1 in a thickness direction, because the identification information display portion 4 is formed on the bottom surface 30 of the recess 3 and is arranged within the space of the recess 3, a contact of the identification information display portion 4 to the surface 11 of another separator 1 is restrained, and thus abrasions of the identification information display portion 4 is restrained.

Further, in case where the identification information display portion 4 is formed on the surface 11 of the separator 1, when a stack is formed by accumulating the plural separators 1 in a thickness direction, there is a risk of generating a gap between adjacent separators 1 because of a thickness of the identification information display portion 4. In those circumstances, there is a risk of causing defects in electric conduction between the separators 1. Further, leakage of active materials may be concerned. With this regard, according to the embodiment of the present invention, because the identification information display portion 4 is formed on the bottom surface 30 of the recess 3 formed on the surface 11 of the separator 1 and the identification information display portion 4 is positioned within the space of the recess 3, even when a stack is formed by accumulating the plural separators 1 in a thickness direction, a contact of the identification information display portion 4 to the surface 11 of the separator 1 is restrained. In those circumstances, because the surfaces 11, 11 of the adjacent separators 1, 1 contact each other, electrical contact between the adjacent separators 1 assumes favorable, the electric conduction between the adjacent separators 1 assumes favorable, and the leakage of the active material from the gap between the adjacent separators 1, 1 is restrained.

Further, even in case where the identification information display portion 4 is formed on the bottom surface 30 of the recess 3, when the projected area of the recess 3 is relatively large, the identification information display portion 4 is likely to contact with other members and thus likely to abrade. According to the embodiment of the present invention, as shown in FIG. 1, an average length of a length L1 of the oxidant inlet bore 20, a length L2 of the oxidant outlet bore 21, a length L3 of the fuel inlet bore 22, a length L4 of the fuel outlet bore 23, a length L5 of the coolant inlet bore 24, and a length L6 of the coolant outlet bore 25 is defined as Lave. The size of the recess 3 is defined LA by LB (i.e., LA×LB) as shown in FIG. 1. LA is defined to be smaller than Lave. LB is also defined to be smaller than Lave. As foregoing, because the projected area of the bottom surface 30 of the recess 3 is restricted, the identification information display portion 4 formed on the bottom surface 30 of the recess 3 unlikely comes in contact with other members, and thus the abrasion of the identification information display portion 4 by other members is retrained. Particular constructions adopted to other embodiments are applicable to the first embodiment.

A second embodiment will be explained referring to FIG. 3. Constructions of the second embodiment are basically the same with the first embodiment, and the second embodiment exerts advantages that are similar to the first embodiment. Explanations for the common construction to the first embodiment will not be repeated. As shown in FIG. 3, a stack 100 is formed by accumulating plural separators 1, terminal members (i.e., serving as a fuel cell component body) 110 which are made based on electric conductive material, for example, copper alloy for obtaining electrical energy, plate shaped insulation members (i.e., serving as a fuel cell component body) 120 which are made based on rigid resin which has electrical insulation properties, and end plates (i.e., serving as a fuel cell component body) 130 in a thickness direction. The stack 100 is constructed by providing fastening rods 610 between the end plates 130, and by fastening the fastening rods 610 with fastening bolts 620. The fastening rod 610 and the fastening bolt 620 serve as a fastening element which fastens the stack 100.

As shown in FIG. 3, the insulation member 120 is provided between the terminal member 110 and the end plate 130, and maintains electrical insulation properties to the end plate 130. Likewise the first embodiment, according to the second embodiment, the recess 3 having a bottom is formed on the surface 11 of the separator 1 (i.e., serving as a recessed region relative to the surface 11). The identification information display portion 4 is provided at the bottom surface 30 of the recess 3 by irradiation of the laser beam or by marking, or the like.

Further, as shown in FIG. 3, a recess (i.e., serving as a recessed region) 3K having a bottom is formed on a surface (i.e., serving as a surface) 111 of the terminal member 110 (i.e., the recess 3K serves as a recessed region relative to the surface 111). An identification information display portion 4K is provided at a bottom surface 30 of the recess 3K by the irradiation of the laser beam or marking, or the like. Further, as shown in FIG. 3, a recess (i.e., serving as a recessed region) 3P having a bottom is formed on a surface (i.e., serving as a surface) 121 of the insulation member 120 (i.e., the recess 3P serves as a recessed region relative to the surface 121). An identification information display portion 4P is provided at a bottom surface 30 of the recess 3P by the irradiation of the laser beam or marking, or the like. Further, as shown in FIG. 3, a recess (i.e., serving as a recessed region) 3M having a bottom is formed on a surface (i.e., serving as a surface) 131 of the end plate 130 (i.e., the recess 3M serves as a recessed region relative to the surface 131). An identification information display portion 4M is provided at a bottom surface 30 of the recess 3M by the irradiation of the laser beam or marking, or the like.

Further, according to the second embodiment, a recess having a bottom may be formed at the side end surface 15 of the separator body 10 as a region which is recessed relative to the side end surface 15, and an identification information display portion(s) may be additionally formed on a bottom surface of the recess by the irradiation of the laser beam or marking, or the like. Further, according to the second embodiment, a recess having a bottom may be formed at a side end surface 118 of the terminal member 110 as a region which is recessed relative to the side end surface 118, and an identification information display portion(s) may be additionally formed on a bottom surface of the recess by the irradiation of the laser beam or marking, or the like. Still further, according to the second embodiment, a recess having a bottom may be formed at a side end surface 138 of the end plate 130 as a region which is recessed relative to the side end surface 138, and an identification information display portion(s) may be additionally formed on a bottom surface of the recess by the irradiation of the laser beam or marking, or the like. Particular constructions adopted in other embodiments are applicable to the second embodiment.

A third embodiment will be explained with reference to FIGS. 4A-4F. Constructions of the third embodiment are basically the same with the first embodiment, and the third embodiment exerts advantages that are similar to the first embodiment. Explanations for the common construction to the first embodiment will not be repeated. The separator body 10 includes the recess 3 having the bottom (i.e., the region recessed relative to the surface 11). The recess 3 includes the bottom surface 30 which is along the surface 11 of the separator 1 and the side surface 33 which is provided continuously from the bottom surface 30 and is along a thickness direction of the separator 1. The identification information display portion 4 is provided at a region of the separator body 10 which is recessed compared to the surface 11, that is, at the bottom surface 30 of the recess 3. According to the foregoing construction, even when the surface 11 of the separator 10 is abraded, the abrasion of the identification information display portion 4 is restrained. Further, the recess 3 includes an outline 35 having a configuration which includes an identification information displaying function. Accordingly, as shown in FIGS. 4A-4F, the configuration of the outline 35 of the recess 3 may be varied to be, for example, quadrilateral, triangular, hexagonal, circular, elliptical, rhombic, pentagonal, heart-shaped, or the like, and each of the recesses 3 may have display function for the identification information particular to the respective configurations of the outline 35 (e.g., showing types of the separator 1). Because the configurations of the outlines 35 of the recesses 3 are readily distinguished by human eyes, unlike a barcode and QR code, or the like, which is difficult to distinguish by human eyes, having varied configurations of the outline 35 of the recess 3 is advantageous to macroscopic distinction. Particular constructions adopted in other embodiments are applicable to the third embodiment.

Figure 5:
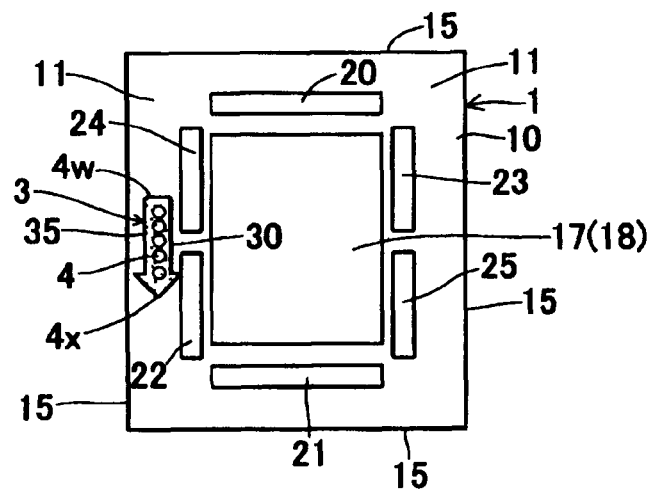
FIG. 5 is a plane view schematically showing a separator according a fourth embodiment of the present invention.

A fourth embodiment will be explained with reference to FIG. 5. Constructions of the fourth embodiment are basically the same with the first embodiment, and the fourth embodiment exerts advantages that are similar to the first embodiment. Explanations for the common construction to the first embodiment will not be repeated. When the identification information display portion 4 is read in a reverse direction, there is a risk of causing an identification error. According to the fourth embodiment, as shown in FIG. 5, the outline 35 of the recess 3 is configured to show a correct reading direction (i.e., arrowed direction) either by a reader or by naked eyes. Thus, the identification information display portion 4 is read in a direction from a starting end 4w to an end edge 4x. Accordingly, the identification error is avoided in case there is a risk causing the identification error when the identification information display portion 4 is read in a reverse direction.

Figure 6:
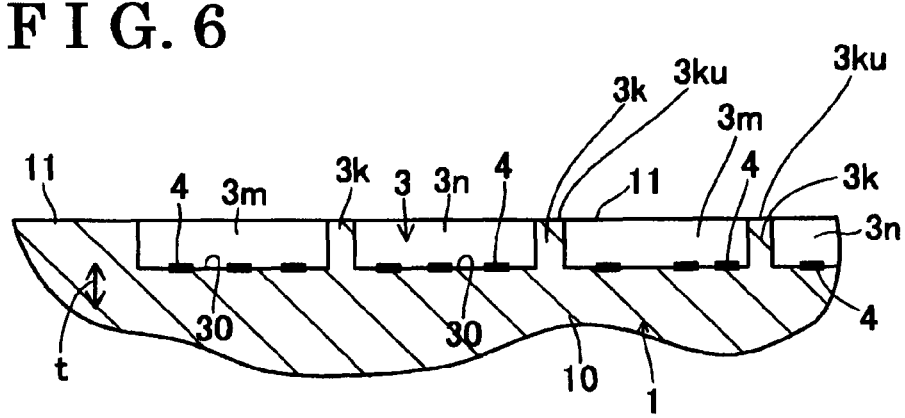
FIG. 6 is a cross-sectional view schematically showing recesses and the vicinity thereof for a separator according to a fifth embodiment of the present invention.

A fifth embodiment will be explained with reference to FIG. 6. Constructions of the fifth embodiment are basically the same with the first embodiment, and the fifth embodiment exerts advantages that are similar to the first embodiment. Explanations for the common construction to the first embodiment will not be repeated. The recess 3 includes plural (e.g., two) recesses (i.e., serving as a recessed region) 3m, 3n and a partition portion 3k which separates the recesses 3m, 3n. A top end 3ku of the partition portion 3k basically has the same height with the surface 11. Because the partition portion 3k is formed, even when the recess 3 has a relative large projected area, other members are unlikely to come in contact with the identification information display portion 4 provided at the bottom surface 30 of the recess 3. Accordingly, abrasions of the identification information display portion 4 is restrained.

Figure 7:
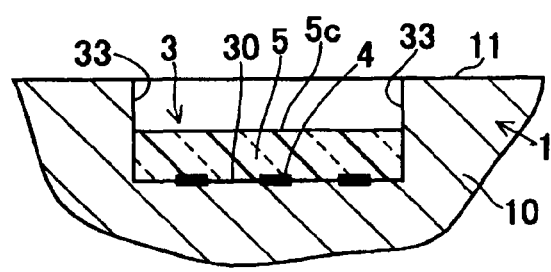
FIG. 7 is a cross-sectional view schematically showing a recess and the vicinity thereof for a separator according to a sixth embodiment of the present invention.

A sixth embodiment will be explained with reference to FIG. 7. Constructions of the sixth embodiment are basically the same with the first embodiment, and the sixth embodiment exerts advantages that are similar to the first embodiment. Explanations for the common construction to the first embodiment will not be repeated. The separator body 10 includes the recess 3 having a bottom as a region recessed relative to the surface 11. The recess 3 includes the bottom surface 30 which is along the surface 11 of the separator 1 and the side surface 33 which is continuously formed from the bottom surface 30 along in a thickness direction of the separator 1. The identification information display portion 4 is provided at the region of the separator body 10 recessed compared to the surface 11, that is, at the bottom surface 30 of the recess 3. Further, according to the sixth embodiment, a transparent layer 5 is formed by embedding, or applying transparent resin with high transparency in the recess 3. The identification information display portion 4 provided at the bottom surface 30 can be seen through the transparent layer 5. Applying the transparent layer 5, protective properties of the identification information display portion 4 provided at the recess 3 is increased, and damages on the identification information display portion 4 are further prevented. In those circumstances, a surface 5c of the transparent layer 5 is set to be at a level lower than the surface 11 of the separator 1. Accordingly, because the surface 5c of the transparent layer 5 is sheltered at the bottom surface 30 side relative to the surface 11 of the separator 1, damages on the surface 5c of the transparent layer 5 is less likely to occur. Further, because at least part of the space of the recess 3 is filled with the transparent layer 5, rigidity of the separator 1 is increased. Further, a level of the height of the surface 5c of the transparent layer 5 may be formed to be the same level with the height of the surface 11 of the separator 1 so that the surface 5c of the transparent layer 5 and the surface 11 of the separator 1 have a single surface level. Particular constructions adopted in other embodiments are applicable to the sixth embodiment.

Figure 8:
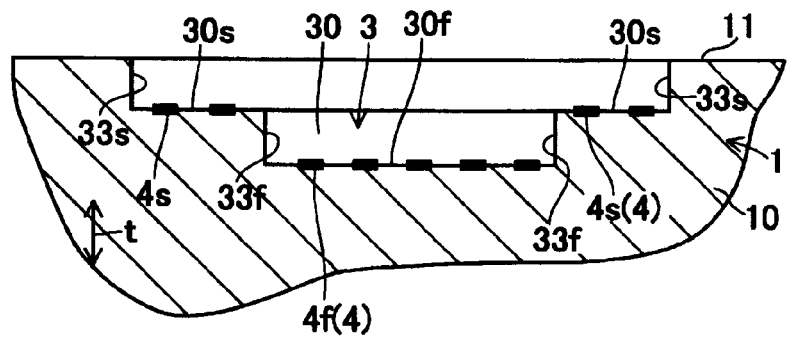
FIG. 8 is a cross-sectional view schematically showing recesses and the vicinity thereof for a separator according to a seventh embodiment of the present invention.

A seventh embodiment will be explained referring to FIG. 8. Constructions of the seventh embodiment are basically the same with the first embodiment, and the seventh embodiment exerts advantages that are similar to the first embodiment. Explanations for the common construction to the first embodiment will not be repeated. The recess 3 having the bottom is formed on the surface 11 as the region of the separator body 10 recessed compared to the surface 11. The recess 3 includes a first bottom surface 30f which is along the surface 11, a first side surface 33f which is continuously formed from the first bottom surface 30f and is along a thickness direction (i.e., direction t in FIG. 8) of the separator 1, a second bottom surface 30s formed along the surface 11 to have shallower level of the depth compared to the first bottom surface 30f, and a second side surface 33s which is formed continuously from the second bottom surface 30s and is along the thickness direction of the separator 1. The identification information display portions 4(4f, 4s) are formed on the first bottom surface 30f and on the second bottom surface 30s of the recess 3 at the separator body 10. A frequency that the first bottom surface 30f having relatively deeper depth comes in contact with other members is less than that of the second bottom surface 30s. For this reason, an identification information display portion 4f (i.e., serving as a second identification information display portion) which has higher priority and is relatively more important (i.e., an identification information display which should not be abraded) is formed on the first bottom surface 30f positioned at the relatively deeper level. To the contrary, a frequency that the second bottom surface 30s having relatively shallower depth comes in contact with other members is relatively high. For this reason, an identification information display portion 4s (i.e., serving as a first identification information display portion), which has relatively lower importance, is formed on the second bottom surface 30s positioned at the relatively shallower level. As the foregoing manner, a depth of the recess 3 is changed in accordance with the importance and/or order of priority of the identification information display portion 4. With the foregoing constructions, the volume of the space of the recess is reduced while ensuring the necessary information amount. Particular constructions adopted in other embodiments are applicable to the seventh embodiment.

Figure 9:
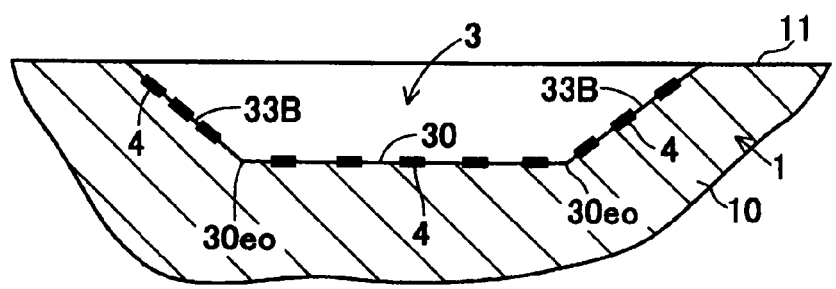
FIG. 9 is a cross-sectional view schematically showing a recess and the vicinity thereof for a separator according to an eighth embodiment of the present invention.

An eighth embodiment will be explained with reference to FIG. 9. Constructions of the eighth embodiment are basically the same with the first embodiment, and the eighth embodiment exerts advantages that are similar to the first embodiment. Explanations for the common construction to the first embodiment will not be repeated. The recess 3 includes the bottom surface 30 which is along the surface 11 and a side surface 33B which is continuously formed from the bottom surface 30. The side surface 33B is formed to incline starting from an end 30eo of the bottom surface 30 to the surface 11. The identification information display portion 4 is formed on the bottom surface 30 and the side surface 33B of the recess 3 at the separator body 10 according to the eighth embodiment.

Particular constructions adopted in other embodiments are applicable to the eighth embodiment.

Figure 10:
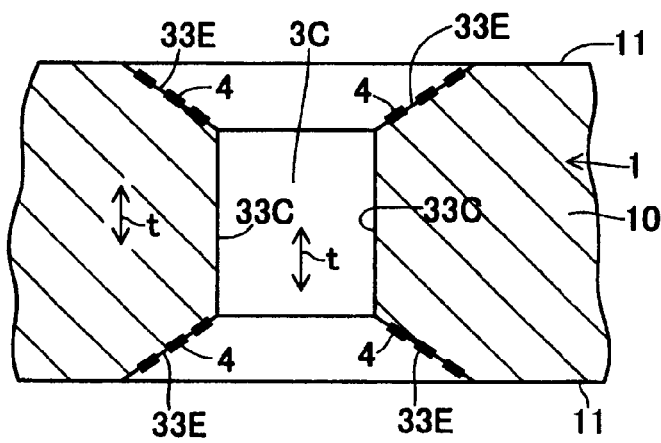
FIG. 10 is a cross-sectional view schematically showing a recess and the vicinity thereof for a separator according to a ninth embodiment of the present invention.

A ninth embodiment will be explained with reference to FIG. 10. Constructions of the ninth embodiment are basically the same with the first embodiment, and the ninth embodiment exerts advantages that are similar to the first embodiment. Explanations for the common construction to the first embodiment will not be repeated. The separator body 10 includes a recess (i.e., serving as a recessed region) 3C serving as a region recessed relative to the surface 11. The recess 3C does not have a bottom, and is penetrated through along a thickness direction (i.e., direction t in FIG. 10) to have a bore side surface 33c of a through hole. The bore side surface 33C includes an inclining surface 33E which inclines to be widen from the inside to the surface 11 to form an inverted conical shape. The identification information display portion 4 is provided at a region which is recessed relative to the surface 11 at the separator body 10, that is, at the inclining surface 33E of the side surface 33C of the recess 3C. Particular constructions adopted in other embodiments are applicable to the ninth embodiment.

Figure 11:
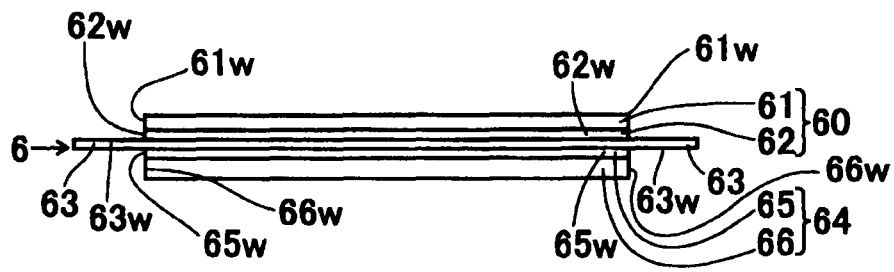
FIG. 11 is a cross-sectional view of a membrane electrode assembly according to a tenth embodiment of the present invention.
Figure 12:
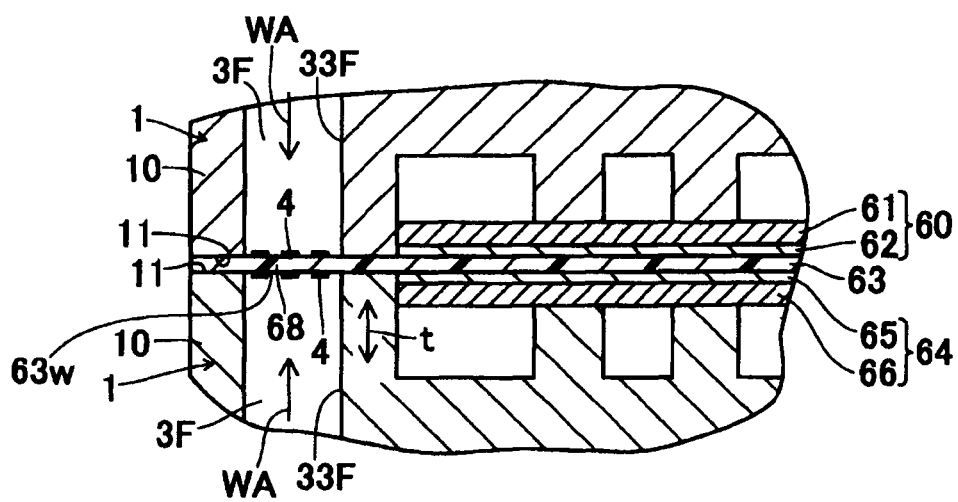
FIG. 12 is an enlarged cross-sectional view of the membrane electrode assembly which is supported by the separator according to the tenth embodiment of the present invention.

A tenth embodiment will be explained with reference to FIGS. 11 and 12. Constructions of the tenth embodiment are basically the same with the first embodiment, and the tenth embodiment exerts advantages that are similar to the first embodiment. Explanations for the common construction to the first embodiment will not be repeated. A membrane electrode assembly (i.e., serving as a fuel cell component body) 6 includes a fuel electrode (anode) 60 which is porous and electrically conductive, a polymer type proton conducting film 63 which is formed with a polymer having a proton conductivity, and an oxidant electrode (cathode) 64 which is porous and electrically conductive, which are piled in mentioned order in a thickness direction. The fuel electrode 60 includes a fuel side gas diffusion layer 61 and fuel side catalyst layer 62 which faces the proton conducting film 63. The oxidant electrode 64 includes an oxidant side catalyst layer 65 which faces the proton conducting membrane 63 and an oxidant side gas diffusion layer 66. An outer edge portion 63w of the proton conducting membrane 63 is arranged to protrude outward relative to an outer edge 61w of the fuel side gas diffusion layer 61, an outer edge 62w of the fuel side catalyst layer 62, an outer edge 65w of the oxidant side catalyst layer 65, and an outer edge 66w of the oxidant side gas diffusion layer 66, and thus the outer edge portion 63w does not face an electric power generation domain. As shown in FIG. 12, the separator body 10 includes a recess (i.e., serving as a recessed region) 3F which is formed as a through hole and serves as a region recessed relative to the surface 11. The recess 3F penetrates through the separator body 10 in a thickness direction thereof, and includes a bore side surface 33F which forms the through hole.

The membrane electrode assembly 6 is sandwiched by two separators 1 to be supported. The outer edge portion 63w of the proton conducting film 63 includes a facing portion 68 which faces the recess 3F formed in the through hole of the separator 1. The identification information display portion 4 which displays the information regarding the fuel cell is formed on surfaces of the facing portion 68 by printing, or the like. In the foregoing manner, the identification information display portion 4 is formed inside the recess 3F. The identification information display portion 4 is visible in arrowed directions WA from the recess 3F formed in the through hole of the separator 1. Particular constructions adopted in other embodiments are applicable to the tenth embodiment.

Figure 13:
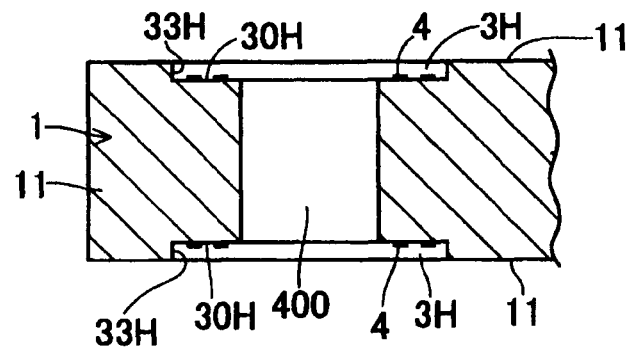
FIG. 13 is a cross-sectional view schematically showing a recess and the vicinity thereof for a separator according to an eleventh embodiment of the present invention.

An eleventh embodiment will be explained with reference to FIG. 13. Constructions of the eleventh embodiment are basically the same with the first embodiment, and the eleventh embodiment exerts advantages that are similar to the first embodiment. Explanations for the common construction to the first embodiment will not be repeated. The separator 1 is formed with a through hole 400. The through hole 400 forms any one of a perforated oxidant inlet bore (an oxidant inlet bore which is formed through the separator 1), a perforated oxidant outlet bore, a perforated fuel inlet bore, a perforated fuel outlet bore, a perforated coolant inlet bore, and a perforated coolant outlet bore. A recess (i.e., serving as a recessed region) 3H is formed at the surface 11 of the separator 1 enclosing the through hole 400. The recess 3H includes a bottom surface 30H and a side surface 33H. The identification information display portions 4 which display the information regarding the fuel cell is formed on the bottom surface 30H. Accordingly, the identification information display portion 4 is formed inside the recess 3H. Although the recess 3H surrounds entire circumference of the through hole 400 in the eleventh embodiment shown in FIG. 13, a part of circumference of the through hole 400 may be surrounded from the outside. Particular constructions of other embodiments are applicable to the eleventh embodiment.

Figure 14A:
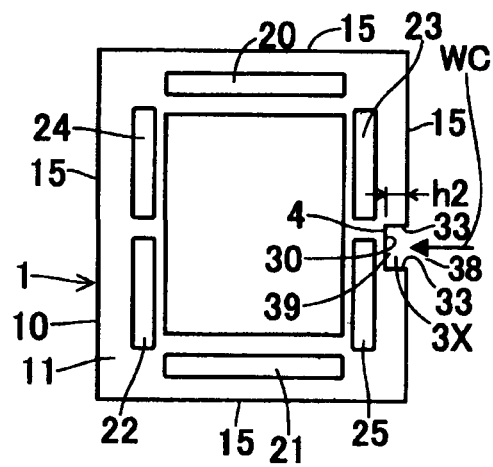
FIG. 14A is a plane view schematically showing the separator according to a twelfth embodiment of the present invention.
Figure 14B:
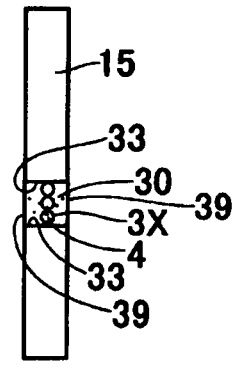
FIG. 14B is a lateral view schematically showing the separator according to the twelfth embodiment of the present invention.

A twelfth embodiment will be explained with reference to FIGS. 14A and 14B. Constructions of the twelfth embodiment are basically the same with the first embodiment, and the twelfth embodiment exerts advantages that are similar to the first embodiment. Explanations for the common construction to the first embodiment will not be repeated. A recess (i.e., serving as a recessed region) 3X having a bottom is formed on one of the end side surfaces 15 which is one of the surfaces of the separator 1 as a region recessed by depth h2 relative to the end side surface 15. The recess 3X includes the bottom surface 30, the side surfaces 33 which face each other, a first opening 38 which opens to a side, and a second opening 39 which opens at the surface 11. The identification information display portion 4 is provided at the recessed region relative to the surface 11 at the recess 3X of the separator 1, that is, at the bottom surface 30 of the recess 3X.

As shown in FIG. 3, according to the twelfth embodiment, a stack is formed by accumulating the plural separators 1 in a thickness direction. In those circumstances, because the recess 3X is formed on the end side surface 15 of the separator 1, the recess 3X opens to the side. Thus, in a state where the separator 1 is assembled as the stack, a user can readily see the identification information display portion 4 formed on the bottom surface 30 of the recess 3X from an arrowed direction WC (i.e., side direction) in FIG. 14. Even when the recess 3 is covered with another member, by removing that member from the stack, the user can readily see the identification information display portion 4.

Further, because the recess 3X is formed at the same position on each of the separators 1, the recess 3X may be used for positioning of the separators 1 when piling the plural separator 1 in the thickness direction. Further, after providing the identification information display portion 4 on the recess 3X formed on the end side surface 15 of the separator 1, the recess 3X may be filled with transparent resin layer. A positioning of the identification information display portion 4 is not limited to at the bottom surface 30 of the recess 3X, and the identification information display portion 4 may also be formed on the side surface 33 of the recess 3X. In those circumstances, the identification information display portion 4 may be formed just on the side surface 33 of the recess 3X or both on the bottom surface 30 and the side surface 33 of the recess 3X. Further, according to the twelfth embodiment, a recess may be formed on the surface 11 of the separator body 10, and a second identification information display portion may be additionally provided on a bottom surface of the recess. Particular constructions adopted in other embodiments are applicable to the twelfth embodiment.

Figure 15:
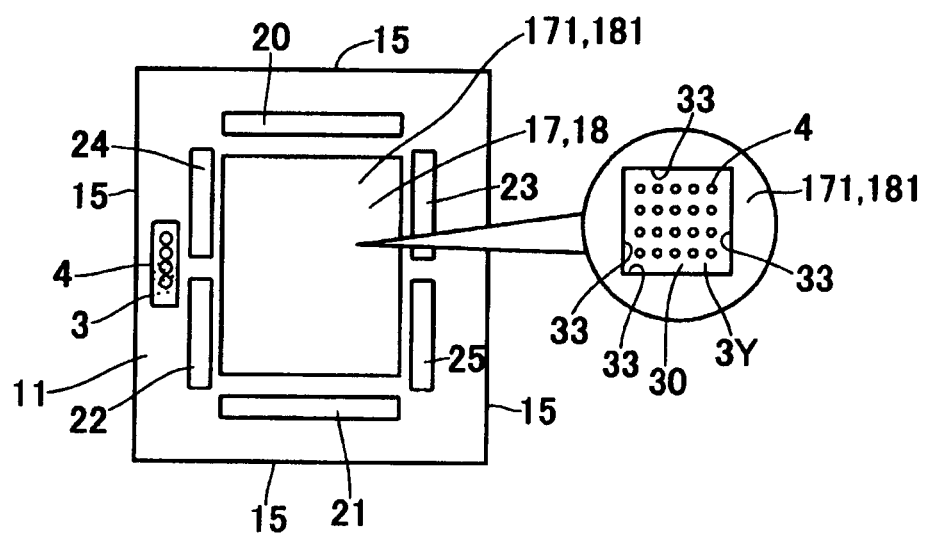
FIG. 15 is a plane view schematically showing a separator according to a thirteenth embodiment of the present invention.

A thirteenth embodiment will be explained with reference to FIG. 15. Constructions of the thirteenth embodiment are basically the same with the first embodiment, and the thirteenth embodiment exerts advantages that are similar to the first embodiment. Explanations for the common construction to the first embodiment will not be repeated. The separator 1 includes the first surface passage 17 and the second surface passage 18, which are provided at opposite sides of the separator 1. The first surface passage 17 forms any one of a fuel passage, an oxidant passage, and a coolant passage. The second surface passage 18 forms one of the rest of the fuel passage, the oxidant passage, and the coolant passage. A recess (i.e., serving as a recessed region) 3Y having a bottom is formed on a passage bottom surface 171 of the first surface passage 17 and/or on a passage bottom surface 181 of the second surface passage 18. The recess 3Y includes the bottom surface 30 and the side surface 33. The bottom surface 30 is determined to be at a deeper level than the passage bottom surfaces 171, 181 of the first surface passage 17 and/or the second surface passage 18. The identification information display portion 4 is provided on the bottom surface 30 of the recess 3Y. Where necessary, when the identification information display portion 4 is provided, because the fluid such as the reactant gas or the water (i.e., when compressed) is unlikely to come in contact with the identification information display portion 4 by a level of the depth of the bottom surface 30 of the recess 3Y, the abrasion of the identification information display portion 4 is prevented. The transparent layer 5 may be formed in the space of the recess 3Y by providing the transparent resin. In case the transparent layer 5 is provided in the space of the recess 3Y, the transparent layer 5 contributes to increase the strength of the separator 1. In case where an identification information display portion is provided on a surface passage without forming a recess, there is a risk that the identification information display portion is abraded by the fluid such as the reactant gas and the water during a use for a long term. With this regard, having the recess 3Y with a bottom is effective. Particular constructions adopted in other embodiments are applicable to the thirteenth embodiment.

A fourteenth embodiment will be explained with reference to FIG. 16. Constructions of the fourteenth embodiment are basically the same with the first embodiment, and the fourteenth embodiment exerts advantages that are similar to the first embodiment. Explanations for the common construction to the first embodiment will not be repeated. The membrane electrode assembly 6 serves as a fuel cell component body. The membrane electrode assembly 6 is formed by laminating, or piling the fuel electrode 60 being porous and having the electrical conductivity, the proton conducting film 63 (i.e., ion conducting film) having the proton conductivity (i.e., ion conductivity), and the oxidant electrode 64 being porous and having electrical conductivity together in mentioned order in a thickness direction. The fuel electrode 60 includes the fuel side gas diffusion layer 61 which is formed by binding aggregation of electric conductive fibers, for example, carbon fibers, with binder having repellency, and a fuel side catalyst layer 62 which faces the proton conducting film 63. The oxidant electrode 64 includes the oxidant side gas diffusion layer 66 which is formed by binding aggregation of electric conductive fibers, for example, carbon fibers, with binder having repellency, and the oxidant side catalyst layer 65 facing the proton conducting film 63.

The proton conducting film 63 may be made from fluorocarbon system polymer (e.g., perfluorosulfonic acid resin) or may be made from hydrocarbon system polymer. A thickness of the proton conducting film 63 may be determined to be 20-200 micrometers, although the thickness depends on the material of the proton conducting film 63. As shown in FIG. 16, the outer edge portion 63w of the proton conducting film 63 protrudes outward along a surface direction relative to the outer edge portion 61w of the fuel side gas diffusion layer 61, to the outer edge portion 62w of the fuel side catalyst layer 62, to the outer edge portion 65w of the oxidant side catalyst layer 65, and to the outer edge portion 66w of the oxidant side gas diffusion layer 66. The fuel side gas diffusion layer 61 and the oxidant side gas diffusion layer 66 are formed in a paper form or cloth form with aggregation of electric conductive fibers, for example, carbon fibers. The electrically conductive fibers are bound one another via binders, for example, fluororesin having repellency.

The fuel side gas diffusion layer 61 includes surfaces (i.e., serving as a surface) 611, 611 which are provided at opposite sides from each other. The oxidant side gas diffusion layer 66 includes surfaces (i.e., serving as a surface) 661, 661 which are provided at opposite sides from each other. A thickness of the fuel side gas diffusion layer 61 is determined to be, for example, 100-300 micrometers. A thickness of the oxidant side gas diffusion layer 66 is determined to be, for example, 100-30 micrometers.

The recess 3 which is recessed relative to the surface 611 is formed on the surface 611 of the fuel side gas diffusion layer 61 by applying the pressure, for example, by pressing, or the like. The recess 3 which is recessed relative to the surface 611 is formed on the surface 661 of the oxidant side gas diffusion layer 66 by applying the pressure, for example, by pressing, or the like. The recess 3 includes the bottom surface 30 with a depth and the side surface 33 along the thickness direction. The identification information display portion 4 is formed on the bottom surface 30 of the recess 3. The identification information display portion 4 displays the information regarding the fuel side gas diffusion layer 61, the oxidant side gas diffusion layer 66, and/or the membrane electrode assembly 6. More particularly, production data (e.g., place of production, producer, production date), sales information (e.g., place of sale, distributor, date of sale) of the membrane electrode assembly 6, and product information (e.g., type, material, specification, trade name, manufacturing process data) are shown. In order to form the identification information display portion 4, at least one of printing, mechanical marking, irradiating laser beam, inkjet, thermal marking, ink stamp, or the like, is adopted. The identification information display portion 4 is formed on the bottom surface of the recess 3 which is formed on the surface 611 of the fuel side gas diffusion layer 61 and the surface 661 of the oxidant side gas diffusion layer 66. Because the membrane electrode assemblies 6 are assembled as a stack, the membrane electrode assembly 6 is pressurized in the thickness direction. Even in those circumstances, the abrasion of the identification information display portion 4 is restrained.

Figure 16:
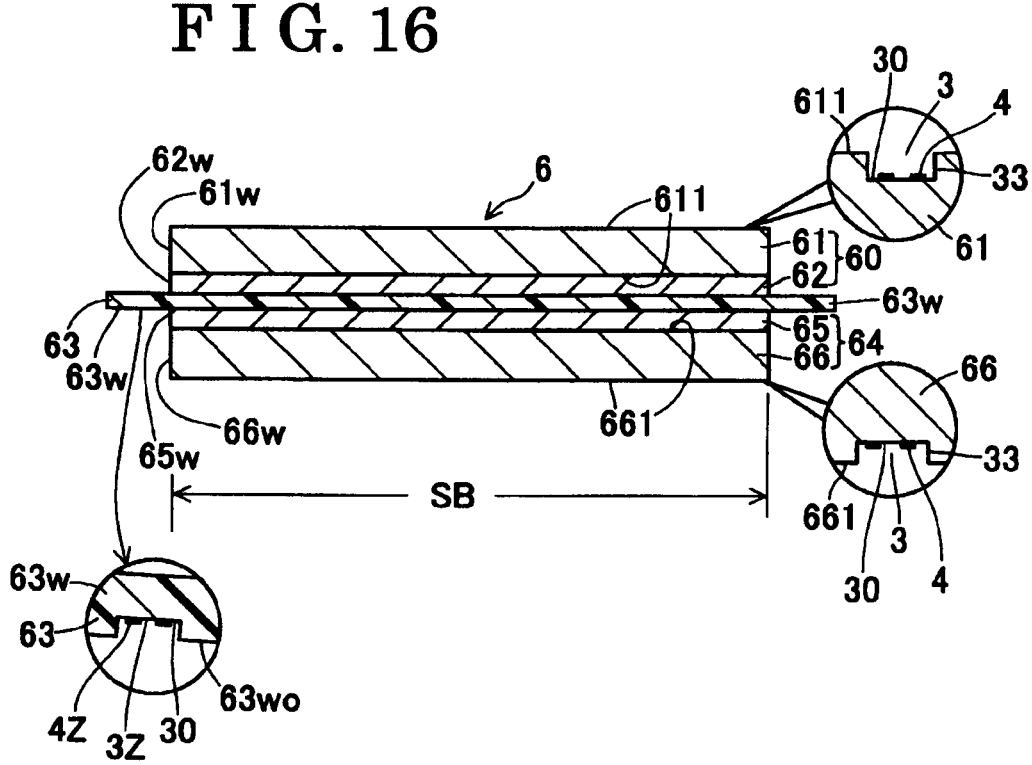
FIG. 16 is an enlarged cross-sectional view of a membrane electrode assembly according to a fourteenth embodiment of the present invention.

Further, as shown in FIG. 16, a portion which contributes to the power generating reaction is a region SB of the proton conducting film 63 which faces the fuel side gas diffusion layer 61 and the oxidant side gas diffusion layer 66. Because the outer edge portion 63w of the proton conducting film 63 is within the region which does not face the fuel side gas diffusion layer 61 and the oxidant side gas diffusion layer 66, the outer edge portion 63w basically does not contribute to the power generating reaction. Because a recess (i.e., serving as a recessed region) 3Z having a bottom is formed at the outer edge portion 63w of the proton conducting film 63 which does not contribute to the power generation, the power generating reaction dose not deteriorate. Namely, the recess 3Z which is recessed relative to a surface (i.e., serving as a surface) 63wo of the outer edge portion 63w is formed by applying the pressure, for example, by pressing.

The recess 3Z includes the bottom surface 30 which is plane and having a depth. An identification information display portion 4Z which displays the information regarding the proton conducting film 63 and/or the membrane electrode assembly 6 is formed on the bottom surface 30 of the recess 3Z. In order to form the identification information display portion 4Z, at least one of printing, mechanical marking, irradiating laser beam, inkjet, thermal marking, ink stamp, or the like, is adopted. With the foregoing, because the frequency that the identification information display portion 4Z contacts other members is reduced compared to the case where the identification information display portion 4Z is directly formed on the surface 63wo of the outer edge portion 63w of the proton conducting film 63, the abrasion of the identification information display portion 4Z is restrained.

Figure 17:
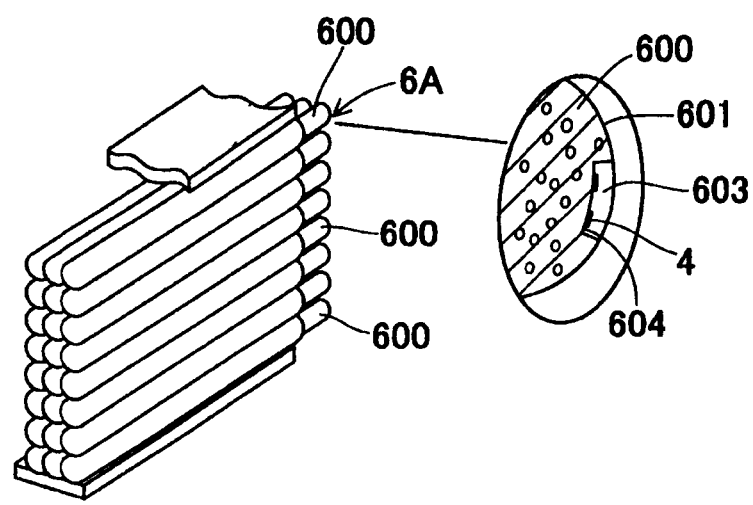
FIG. 17 is a perspective view of a main portion of a stack having a tube type membrane electrode assembly according to a fifteenth embodiment of the present invention.

A fifteenth embodiment will be explained with reference to FIG. 17. A membrane electrode assembly 6A is made in a tube shape and includes an electrode (i.e., serving as a fuel cell component body) 600 which is porous and electrically conductive. A recess (i.e., serving as a recessed region) 603 is formed on a surface (i.e., serving as a surface) 601 which is an outer peripheral surface of the electrode 600. The recess 603 is formed to be recessed relative to the surface 601. The identification information display portion 4 is formed on a bottom surface 604 of the recess 603.

According to the embodiments of the present invention, by providing a projection in the vicinity of the identification information display portion, advantages that are similar to the foregoing is obtained. Namely, when other members are provided to make a contact with a surface which is provided with the identification information display portion of fuel cell components, a portion which protrudes relative to the identification information display portion comes in contact with the members but the identification information display portion does not come to directly contact with the members.

Particular constructions applied to an embodiment may be applied to the other embodiments.

A fuel cell component, including a fuel cell component body having a surface, an identification information display portion provided at the fuel cell component body, the identification information display portion provided at the fuel cell component body, and a projection portion projecting from a wall surface on which the identification information display portion is formed in a direction to be away from the identification information display portion and restraining a contact of the identification information display portion with another member.

According to the embodiment of the present invention, a fuel cell component may be applicable to, for example, a vehicle, a stationary use, an electrical equipment, a mobile use, or the like.

According to the embodiment of the present invention, the fuel cell component is advantageous to restrain abrasions of the identification information display portion.

According to the disclosed subject matter, the fuel cell component includes the fuel cell component body 6, 10, 110, 120, 130, 600 having the surface 11, 111, 121, 131, 15, 611, 661, 63wo, 601 and the identification information display portion 4, 4K, 4P, 4M, 4s, 4f, 4Z provided at the fuel cell component body 6, 10, 110, 120, 130, 600. The identification information display portion 4, 4K, 4P, 4M, 4s, 4f, 4Z is provided at the region 3, 3K, 3P, 3M, 3m, 3n, 3C, 3F, 3H, 3X, 3Y, 3Z, 603 of the fuel cell component body 6, 10, 110, 120, 130, 600 which is recessed relative to the surface 11, 111, 121, 131, 15, 611, 661, 63wo, 601. Thus, the contact of the identification information display portion to another member is restrained, and the abrasion of the identification information display portion 4, 4K, 4P, 4M, 4s, 4f, 4Z is restrained. Accordingly, the identification information display portion 4, 4K, 4P, 4M, 4s, 4f, 4Z achieves the function for a long term. The recessed region 3, 3K, 3P, 3M, 3m, 3n, 3C, 3F, 3H, 3X, 3Y, 3Z, 603 which is recessed relative to the surface 11, 111, 121, 131, 15, 611, 661, 63wo, 601 may be the bottom surface 30, 30s, 30f, 30H, 604 of the recess and/or the side surface 33, 33B, 33E of the recess 3, 3C, 3X (i.e., the surface which contacts the bottom surface and the surface. Namely, the identification information display portion is positioned within the recess.

According to the disclosed subject matter, the identification information display portion 4, 4K, 4P, 4M, 4s, 4f, 4Z is provided at the recessed region relative to the surface 11, 111, 121, 131, 15, 611, 661, 63wo, 601 of the fuel cell component body 6, 10, 110, 120, 130, 600. Thus, even when the fuel cell component is used for a long term, the abrasion of the identification information display portion 4, 4K, 4P, 4M, 4s, 4f, 4Z is effectively retrained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A fuel cell component, comprising:
a fuel electrode configured to be supplied with fuel and being porous and electrically conductive;
a proton conducting film including a proton conductivity; and
an oxidant electrode configured to be supplied with oxidant and being porous and electrically conductive;
a plurality of fuel cell component bodies each including a surface;
a recessed region of each fuel cell component body recessed relative to the surface, the recessed region including a bottom surface and side surfaces that extend continuously from a perimeter of the bottom surface of the recessed region to the surface of the fuel cell component body; and
an identification information display portion on the bottom surface of the recessed region,
wherein the recessed region is formed at a same position on each of the plurality of fuel cell component bodies, and the bottom surface of the recessed region of one of the plurality of fuel cell component bodies faces an adjacent fuel cell component body of the plurality of fuel cell component bodies,
wherein the fuel cell component is a membrane electrode assembly, and
wherein the fuel electrode, the proton conducting film, and the oxidant electrode are stacked in order; and wherein at least one of the fuel electrode, the proton conducting film, and the oxidant electrode includes the recessed region and the identification information display portion is provided at the recessed region.

2. The fuel cell component according to claim 1, wherein the recessed region of the one of the plurality of fuel cell component bodies is configured so that the identification information display portion does not contact the adjacent fuel cell component body.

3. The fuel cell component according to claim 1, wherein the identification information display portion includes an identification information displaying function displayed by at least one of optical characteristic, magnetic characteristic, a visual characteristic, and a recessed and/or protruding configuration characteristic.

4. The fuel cell component according to claim 1, wherein the fuel cell component bodies are each one of a separator, an insulation member, a terminal member, and an end plate, which are applied in a fuel cell stack.

5. The fuel cell component according to claim 1, wherein the identification information display portion is covered with a transparent layer, and the transparent layer is applied at the recessed region.

6. The fuel cell component according to claim 1, wherein the recessed region includes a plurality of bottom surfaces which are provided at different levels of depth;
the identification information display portion includes a first identification information display portion and a second identification display portion; and wherein
the first identification information display portion is provided at a first bottom surface provided at a predetermined level of depth and the second identification information display portion is provided at a second bottom surface provided at deeper level than the predetermined level of the depth.

7. The fuel cell component according to claim 1, wherein the recessed region and/or the identification information display portion includes a portion which indicates a direction for reading the identification information display portion.

8. The fuel cell component according to claim 1, wherein the recessed region includes a partition which divides the recessed region into plural recessed regions.

* * * * *